United States Patent
Habib et al.

(10) Patent No.: US 11,280,546 B2
(45) Date of Patent: Mar. 22, 2022

(54) PROCESS FOR CALCINING MINERAL ROCK IN A REGENERATIVE PARALLEL-FLOW VERTICAL SHAFT FURNACE, AND FURNACE USED

(71) Applicant: S. A. Lhoist Recherche et Developpement, Ottignies-Louvain-la-Neuve (BE)

(72) Inventors: Ziad Habib, Linkebeek (BE); Guilhem Padox, Genissieux (FR)

(73) Assignee: S. A. Lhoist Recherche et Developpement, Ottignies-Louvain-la (BE)

( * ) Notice: Subject to any disclaimer, the term of this patent is extended or adjusted under 35 U.S.C. 154(b) by 689 days.

(21) Appl. No.: 15/765,002

(22) PCT Filed: Oct. 5, 2016

(86) PCT No.: PCT/EP2016/073796
§ 371 (c)(1),
(2) Date: Mar. 30, 2018

(87) PCT Pub. No.: WO2017/060303
PCT Pub. Date: Apr. 13, 2017

(65) Prior Publication Data
US 2018/0283788 A1 Oct. 4, 2018

(30) Foreign Application Priority Data
Oct. 6, 2015 (BE) .................................. 2015/5631

(51) Int. Cl.
*F27B 1/00* (2006.01)
*C04B 2/12* (2006.01)
(Continued)

(52) U.S. Cl.
CPC ................ *F27B 1/005* (2013.01); *C04B 2/12* (2013.01); *F27B 1/02* (2013.01); *F27B 1/04* (2013.01);
(Continued)

(58) Field of Classification Search
CPC ... C04B 2/02; C04B 2/12; F27B 1/005; F27B 1/02; F27B 1/04; F27B 1/10; F27B 1/16;
(Continued)

(56) References Cited

U.S. PATENT DOCUMENTS 3,074,706 A * 1/1963 Schmid ..................... F27B 1/04
432/14
3,771,946 A * 11/1973 Hofer ....................... F27B 1/02
432/14
(Continued)

FOREIGN PATENT DOCUMENTS

CA          945363       4/1974
CN        1158954 A      9/1997
(Continued)

OTHER PUBLICATIONS

PCT/EP2016/073796, International Search Report, dated Dec. 12, 2016; 3 pages.

*Primary Examiner* — Steven B McAllister
*Assistant Examiner* — Benjamin W Johnson
(74) *Attorney, Agent, or Firm* — Whitaker Chalk Swindle & Schwartz PLLC; Charles Gunter (57) ABSTRACT

Process for calcining mineral rock in a regenerative parallel-flow vertical shaft furnace, containing at least two shafts (1, 2) interconnected by a gas transfer channel (3), each shaft operating alternately in firing mode and in preheating mode, the firing mode comprising a combustion of fuel in the presence of air so as to obtain a firing of the rock to give calcined rock, an emission of combustion gases, and a
(Continued)

passage of these gases from one shaft to the other by means of said channel (3), the preheating mode comprising a heat exchange between said rock and said combustion gases from said channel (3), this process additionally comprising an injection of supplementary air into said channel (3) with oxidation of unburnt products contained in the combustion gases passing through this channel.

17 Claims, 6 Drawing Sheets

(51) Int. Cl.
*F27B 1/16* (2006.01)
*F27D 7/02* (2006.01)
*F27B 1/02* (2006.01)
*F27B 1/10* (2006.01)
*F27B 1/04* (2006.01)
*F27B 1/24* (2006.01)
*C04B 2/02* (2006.01)
*F27B 1/28* (2006.01)

(52) U.S. Cl.
CPC ............... *F27B 1/10* (2013.01); *F27B 1/16* (2013.01); *F27B 1/24* (2013.01); *F27D 7/02* (2013.01); *C04B 2/02* (2013.01); *F27B 1/28* (2013.01); *Y02P 40/40* (2015.11)

(58) Field of Classification Search
CPC ...... F27B 1/24; F27B 1/28; F27D 7/02; Y02P 40/40
USPC .......................................................... 432/95
See application file for complete search history.

(56) References Cited

U.S. PATENT DOCUMENTS

| 3,822,989 A | * | 7/1974 | Tschinkel ................. F27B 1/02 432/95 |
| 4,315,735 A | | 2/1982 | Fussl et al. |
| 4,927,357 A | * | 5/1990 | Yap .......................... F23C 5/08 432/22 |
| 6,113,387 A | | 9/2000 | Wilson et al. |
| 2011/0229387 A1 | | 9/2011 | Thibeaumont et al. |

FOREIGN PATENT DOCUMENTS

| CN | 200978255 Y | 11/2007 |
| DE | 19843820 A1 | 3/2000 |
| FR | 2091767 A5 | 1/1972 |

* cited by examiner

PROCESS FOR CALCINING MINERAL ROCK IN A REGENERATIVE PARALLEL-FLOW VERTICAL SHAFT FURNACE, AND FURNACE USED

BACKGROUND OF THE INVENTION

1. Field of the Invention

This invention relates to a method for calcining mineral rock in a regenerative parallel-flow vertical shaft furnace (Parallel Flow Regenerative Kiln, PFRK) wherein at least two shafts are interconnected by a gas transfer channel.

2. Description of the Prior Art

Regenerative parallel-flow furnaces generally comprise two or three vertical shafts interconnected in their central portion by a crossover channel. These shafts operate in alternation: one operates in firing mode (calcining) for a predetermined period of time, for example from 10 to 12 minutes, while the other or the others operate(s) in preheating mode of the mineral rock. Then the shaft in firing mode switche(s) to preheating mode while the shaft or one of the shafts in preheating mode switches to firing mode. An operating cycle is repeated as such every time a given shaft starts to operate in firing mode again.

The method used in these known furnaces comprises
a loading of mineral rock at the top of the shafts, and
an unloading of calcined mineral rock at the bottom of the shafts,
each shaft operating alternately in firing mode and in preheating mode, with one shaft being in firing mode for a predetermined period of time while another shaft is in preheating mode, and inversely,
the firing mode comprising, in the presence of said mineral rock, a combustion of fuel in the presence of gas containing oxygen so as to obtain a firing of this rock to give calcined rock, an emission of combustion gases, and a passage of these combustion gases from the shaft in firing mode to the other shaft in preheating mode through said gas transfer channel,
the preheating mode comprising a heat exchange between said mineral rock and said combustion gases from said gas transfer channels.

The term mineral rock, in terms of this invention, means in particular limestone rock, dolomitic rock, and/or magnesite which are calcined respectively into quicklime, into quick dolime and into magnesia.

The mineral stones or rocks are loaded at the top of the shafts. It is also in the upper portion of these shafts that the lances are located allowing for a supply of fuel in the furnace. The preheating zone of the stones is located between the top of the shaft and the ends of the fuel lances. The stones, which reach the end of the lances, then reach, in the shaft in firing mode supplied with fuel and with gas containing oxygen, a temperature varying generally from 800° C. to 1,300° C. The shaft or shafts in preheating mode are then not supplied with fuel. The stones placed in the shaft or shafts in preheating mode recover the energy from the gases from the shaft in firing mode. The activity of the shafts is inverted, for example every ten to twelve minutes, when the injection of fuel stops in the shaft in firing mode and the latter then switches to preheating mode and vice versa. When there are two shafts, a cycle therefore generally lasts between twenty and twenty-four minutes.

With a concern for economy, it is advantageous in this type of installation to use inexpensive fuels. Unfortunately, the content of nitrogen and of sulphur of these inexpensive fuels is high, which potentially gives rise to environmental issues due to the emission of gases such as nitrogen oxides $NO_x$ or sulphur oxides $SO_x$. Another problem encountered with the use of fuels with a high sulphur content is that the latter is generally captured by the lime, which is not desired for certain applications such as in steel making where the maximum content in sulphur in the lime is generally limited to 0.1% by weight.

Methods for allowing reduction in the content of sulphur in the lime are in particular described in documents BE 1018212 and U.S. Pat. No. 4,315,735. In these patents, it is recommended to reduce the quantity of air supplied in the shaft in firing mode in order to carry out an incomplete combustion of the fuels. This manipulation effectively makes it possible to prevent the sulphur to be captured by the lime in the shaft in firing mode. It is observed that it also makes it possible to reduce the quantity of the $NO_x$ formed in this shaft in firing mode. The primary transport air of the fuel plays a particularly important role in the combustion and the formation of $NO_x$ as it is premixed with the fuel and is rapidly available to combine with nitrogen, contained in the fuel, as soon as the temperature so allows. A reduction in the quantity of this primary air is therefore favourable for reducing $NO_x$. Unfortunately, the incomplete combustion of fuels also leads to an increase in the quantity of unburnt products in the combustion gases reaching the outlet of the furnace, mainly carbon monoxide. In these prior documents, the reduction in the air supplied in the shaft in firing mode is carried out until the observation of a threshold value of carbon monoxide CO measured downstream from the shaft in firing mode, in the crossover channel. These methods are therefore based on the observation of an increase in the content of CO in the gases emitted at the outlet of the furnace, which reveal a loss of energy in the method and represent a major disadvantage in terms of atmospheric pollution, these gases which can even be incompatible with some environmental legislations.

In order to improve the performance of the furnaces, it is known to introduce a gaseous, liquid or solid fuel into the crossover channel (see FR 2091767 and DE 19843820). Finally, it is also known to inject oil into the crossover channel, via a lance, as a source of heat during the start-up of the furnace (see U.S. Pat. No. 6,113,387).

SUMMARY OF THE INVENTION

This invention has for purpose to overcome these disadvantages by procuring a method that makes it possible to avoid the disadvantages linked to the content of sulphur and nitrogen of the inexpensive fuels used, without however causing an inadmissible increase in unburnt products in the combustion gases exiting the furnace and therefore a corresponding loss of energy and pollution.

It is provided according to the invention, a method such as indicated at the beginning and which further comprises an additional injection of gases containing additional oxygen into said gas transfer channel with oxidation of unburnt products contained in the combustion gases passing through this gas transfer channel.

The term unburnt products, according to this invention, means any substance that has imperfectly combined with the oxygen of the gas containing oxygen used for the combustion of the fuel. These unburnt products can therefore include fine particles of carbon that are not burnt during the combustion, organic molecules, but also and especially carbon monoxide. The presence of carbon monoxide in combustion gases reveals an incomplete oxidation reaction of the fuel during combustion. As this oxidation reaction is exothermal, this means that, if it is incomplete, a portion of the potential energy contained in the fuel has been lost.

The method according to the invention has the great advantage of oxidising the unburnt products present, in particular the carbon monoxide contained in the combustion gases, and therefore of avoiding the aforementioned loss of energy, and this significantly during their passage from one shaft to the other. The supplying of gas containing additional oxygen therefore takes place outside of the shafts, in a space provided for a transfer of gases from one shaft to the other. It therefore does not interfere in the operation provided inside the shafts.

The term gas containing oxygen can mean in this invention air, oxygen-enriched air, or oxygen, for example tonnage oxygen. The gases containing additional oxygen can also be air, oxygen-enriched air, or oxygen, for example tonnage oxygen, and furthermore contain an additive that makes it possible to improve the oxidation of the unburnt products such as combustion catalysts. Mention can be made for example of the enrichment with oxygen of the additional gas where the use of oxygen makes it possible to improve the oxidation reaction of the unburnt gases in the gas transfer channel. Such a method makes it possible to more easily stabilise the quantity of CO produced and to keep it below the maximum authorised values. In the rest of the description, the expression gas containing oxygen will be, for reasons of simplicity, expressed sometimes only by the term air.

The method according to the invention as such makes it possible to operate without disadvantage in conditions that, in a manner known per se, have for effect to reduce the content of $NO_x$ in the gases emitted by the furnace.

Indeed, it is known that the organic atomic nitrogen of the fuels reacts with the oxygen contained in the combustion air according to the following simplified reactions:

$$2N+O_2 \rightleftharpoons 2NO$$

$$2NO+O_2 \rightleftharpoons 2NO_2$$

By reducing in particular the supply of oxygen in the shaft in firing mode during the combustion of the fuels, the reactions hereinabove are, then, not favoured.

Contrary to the methods known in prior art, the method according to the invention, although it makes it possible to reduce the quantity of $NO_x$ in a regenerative parallel-flow furnace, furthermore prevents the increase of the content of CO in the gases at the outlet of the furnace. This method therefore offers the advantage of being able to use inexpensive fuels or raw materials, rich in nitrogen and in sulphur such as petroleum coke or wood waste, while still complying with the environmental legislations concerning the contents in sulphur dioxide, nitrogen oxides but also in carbon monoxide contained in the gases emitted. It is indeed understood that all types of usual solid, liquid or gaseous fuels in the technique can be used for the firing of the mineral rock according to this invention, such as coal, wood, lignite, bituminous shale, peat, coal, anthracite, alcohols, oil and the derivatives thereof, natural gas, biogas, liquefied petroleum gas, waste (for example wood waste, grape seeds, etc.), etc.

Moreover, the decrease of the supply of global air in the shaft in firing mode makes it possible to reduce the load losses linked to the flow of the gases through the bed of stones of this shaft which means that a more substantial quantity of mineral rock can be supplied in this shaft. Consequently, the method according to this invention also makes it possible to increase the productivity of the furnace. This forms an economical and ecological gain given that fuels rich in nitrogen and sulphur and therefore inexpensive can be used, that the instantaneous productivity of the furnace is increased, and that the quantities of atmospheric pollutants emitted are limited.

In particular, according to the invention, the gas containing oxygen supplied in a shaft in firing mode is in the form of a gas containing primary oxygen conveyed simultaneously to the fuel, in particular by fuel lances, and a gas containing secondary oxygen, introduced at the top of this shaft through the rock to be fired. The primary air is therefore used in particular for the transport of the fuel and for the combustion of the latter or for the cooling of the fuel injection lances. A reduction in the supply of primary air then leads to an incomplete combustion of the fuel in the firing shaft resulting in a non-negligible production of unburnt products, in particular carbon monoxide. In order to optimise the reduction in the supply of air in the firing shaft, a reduction in the supply of secondary air can also be carried out.

DETAILED DESCRIPTION OF THE INVENTION

According to a particular embodiment of the invention, the oxidation of unburnt products, produced during the aforementioned injection of gas containing additional oxygen, is carried out at an oxidation temperature that is high enough to allow the oxidation of the carbon monoxide and low enough to prevent a thermal degradation of the molecules of dinitrogen $N_2$ into atomic nitrogen N. This oxidation temperature is advantageously provided between 800° C. and 1,300° C., more preferably between 900° C. and 1,250° C. Indeed, the emissions of nitrogen oxide $NO_x$ come from two separate reactions: the reaction of the organic atomic nitrogen of the fuels with the oxygen of the air such as described hereinabove and the thermal decomposition of the molecular nitrogen of the air in the presence of oxygen.

The thermal decomposition of the molecular nitrogen contained in the air requires a temperature greater than 1,250° C. The $NO_x$ are then formed by the combination of the atomic nitrogen resulting from the thermal degradation and of the oxygen available in the air according to the following simplified reactions:

$$N2(air) \rightleftharpoons 2N$$

$$2N+O_2 \rightleftharpoons 2NO$$

$$2NO+O_2 \rightleftharpoons 2NO_2$$

The temperature at the location of the injection of the gas containing additional oxygen is therefore essential for optimising the method by favouring the oxidation of the carbon monoxide into carbon dioxide and by limiting the formation of $NO_x$ in the gas transfer channel interconnecting the shafts.

Preferably, according to an embodiment of the method according to the invention, the quantity of additional oxygen injected into said gas transfer channel using the gas containing additional oxygen is between 0.1 and 50 times the stoichiometric quantity of oxygen calculated based on the quantity of CO measured at the outlet of the furnace (at the stack) in the absence of this gas containing additional oxygen.

The expression "stoichiometric quantity" means, according to this invention, the theoretical quantity of oxygen required in order for the oxidation reaction of the carbon monoxide to be complete and take place in stoichiometric conditions. These stoichiometric proportions are calculated in relation to the quantity of CO measured in the gases at the outlet of the furnace (at the stack) in the absence of the gas containing the additional oxygen.

The quantity of oxygen to be added is in particular dictated by the quantities of CO and of $O_2$ present in the flue gases of the furnace, as well as by the minimum speed of this gas containing the additional oxygen required in order to provide a good mixture of additional oxygen in the flue gases; for example this speed can be at least equal to the speed of the flue gases (about 5 to 15 m/s).

In addition, according to a particular embodiment, the gas containing additional oxygen can have at the time of the injection a temperature between ambient temperature and 400° C. Controlling this temperature furthermore makes it possible to prevent the cooling of the gas transfer channel which would cause a decrease in the effectiveness of the oxidation of the carbon monoxide into carbon dioxide.

According to a particular embodiment of the invention, the gas transfer channel is a crossover channel that directly connects one shaft to the other. More preferably the injection of the gas containing the additional oxygen into the crossover channel takes place at an equal distance from the shafts that it interconnects. This position at an equal distance from the shafts is favourable given that the operating modes of the shafts are regularly inverted. The injection of the additional gas when it is carried out at an equal distance from the shafts is, then, independent of the alternation of the firing and preheating modes of the shafts of the furnace.

In addition, advantageously, according to the method according to the invention, the fuel is conveyed into the shaft in firing mode by lances that produce parallel beams of streams of fuel that undergo the combustion and form lines of combustion gases that pass through the crossover channel, with an injection of the aforementioned gas containing additional oxygen being carried out on each one of these lines of combustion gas. A CFD simulation (Computational Fluid Dynamics) made it possible to obtain a mapping of the distribution of the temperatures and of the concentration in oxygen in the shaft in firing mode and in the crossover channel. These simulations have revealed that, during their displacement in the crossover channel to then passing into the shaft in preheating mode before exiting the furnace, the gases from the combustion, such as CO, follow trajectories defined by the position of the fuel lances. These trajectories which are also called combustion gases flow lines also correspond to the locations of the crossover channel where the temperature is adequate for an optimum oxidation of the unburnt products.

According to another particular embodiment of the method of the invention, said gas transfer channel is formed from a crossover channel that connects peripheral channels arranged around each shaft in such a way as to allow an access to the combustion gases from each shaft in the crossover channel. In this case, said injection of gas containing additional oxygen can take place in the crossover channel, in the peripheral channels or both in the crossover channel and the peripheral channels.

Advantageously, the method according to the invention applies to a regenerative parallel-flow vertical shaft furnace that comprises two shafts. The furnace can comprise three shafts and three gas transfer channels which each interconnect two of said aforementioned shafts, and then one shaft is in firing mode for a predetermined period of time while the other two shafts are in preheating mode.

According to a preferred embodiment of the method of the invention, the mineral rock is chosen from the group comprised of limestone rock, dolomitic rock, magnesite and mixtures thereof.

In this case, the method of this invention is a method for the production of quicklime and/or of quick dolime and/or of magnesia in a regenerative parallel-flow vertical shaft furnace.

The shafts of the furnace can each be loaded with a mineral rock of the same nature. Alternatively, the shafts of the furnace can each be loaded with a mineral rock of a different nature.

Other embodiments of the method according to the invention are indicated in the annexed claim.

This invention also relates to a regenerative parallel-flow vertical shaft furnace for the production of calcined mineral rock comprising at least two shafts interconnected by a gas transfer channel, with each one of said shafts comprising at least one device for supplying with fuel, at least one supply of gas containing oxygen for the combustion of the fuel, an inlet for the loading of mineral rock, and an outlet for the unloading of said calcined mineral rock produced, and a removal of combustion gases.

The furnace according to this invention further comprises a source of gas containing additional oxygen and an injection device connected to this source of gas containing additional oxygen and arranged to inject this gas containing additional oxygen into said gas transfer channel. This device makes it possible to resolve the problem linked to the formation of unburnt products during combustion. Indeed, according to this invention, unburnt products, such as CO, formed in the shaft in firing mode and passing through the gas transfer channel, are oxidised by the additional air before reaching the shaft in preheating mode and then the outlet of the furnace. This makes it possible to prevent any loss of energy resulting from an imperfect oxidation of the carbon materials forming the fuel and to respond to the environmental requirements concerning the content of CO of the combustion gases discharged into the atmosphere. The oxidation of the unburnt products moreover takes place in a space located outside of the shafts and the supply of gas containing additional oxygen does not influence because of this the operation of the shafts themselves. This is important in particular when the firing of the stones or rocks is carried out in conditions that lead to incomplete combustion of the fuels. Indeed, the incomplete combustion makes it possible, in particular, to reduce the content of $NO_x$. With a furnace according to the invention, the quantities of $NO_x$ are then reduced while the content of CO in the gases emitted is maintained less than the legal prescriptions.

According to the invention, the gas transfer channel can be a crossover channel that directly connects one shaft to the other. It can also be formed from a crossover channel that connects peripheral channels arranged around each shaft in such a way as to allow an access to the combustion gases from each shaft in the crossover channel. In this latter case, the aforementioned injection device is arranged to inject gases containing additional oxygen into a crossover channel, in the peripheral channels or both in the crossover channel and the peripheral channels.

Advantageously, the injection device comprises at least one straight perforated injection unit introduced into the crossover channel and supplied by a source of gas containing additional oxygen. This injection unit is advantageously placed transversely with respect to the longitudinal axis of the crossover channel but can also be oriented in divergence in relation to the transversal axis of the crossover channel. This device makes it possible to easily inject the additional air downstream of the shaft in firing mode, and over practically the entire width of the crossover channel, in order to oxidise a maximum of the unburnt products, in particular from incomplete combustion.

Preferably, according to this invention, the injection unit comprises one or several orifices oriented to inject the gas containing additional oxygen towards a top portion of the crossover channel. The mappings obtained using CFD simulations have also revealed that the gases from the combustion are primarily located in the upper portion of the crossover channel where it is also true that that the temperatures are the highest. As described above, the temperature is important for the oxidation reaction of the unburnt products. In order to obtain an optimum oxidation of the unburnt products from the shaft in firing mode, the injection of additional air is therefore preferably carried out in the upper portion of the crossover channel.

According to a particular embodiment, the furnace has an injection unit introduced into the crossover channel by an opening that is equally distant from said shafts. The injecting of the additional gas is, then, independent of the alternation of the firing and preheating modes of the shafts of the furnace.

According to a particular embodiment of the invention, the crossover channel has a ceiling and a longitudinal axis and the gas injection device containing additional oxygen comprises one or several openings provided in this ceiling of the crossover channel through which the gas containing additional oxygen can be supplied using a source of such a gas, said openings being located at an equal distance from the shafts and perpendicularly to this longitudinal axis. These orifices represent an effective alternative to the injection unit given that they make it possible to inject the additional gas directly into the combustion gas flow lines on the ceiling of the crossover channel. As proven by the CFD simulations, it is effectively in these locations that the quantity of unburnt products is maximal and that the temperature is ideal for the oxidation of the latter.

In this particular embodiment, said openings of the device for injecting gases containing the additional oxygen are advantageously provided with mechanical systems for distributing or setting into rotation that make it possible to improve the distribution of the additional air in the crossover channel.

In a particularly advantageous embodiment of the furnace according to the invention, the device for supplying with fuel comprises one or several series of one or several single-stream or multi-stream lances arranged in such a way as to produce parallel beams of streams of fuel in the corresponding shaft, with these beams being parallel to one another, with the streams of fuel of the various aforementioned beams being located in several planes parallel to the longitudinal axis of the crossover channel.

Advantageously, in the furnace according to the invention, the orifices of the injection unit or the openings in the ceiling of the crossover channel for the injection of the additional gas containing oxygen are provided in said planes formed by the aforementioned beams. As described above thanks to the CFD simulations, these planes represent the flow lines of the gases from the combustion.

Advantageously, the furnace according to the invention comprises two shafts and a gas transfer channel that interconnects them. It can also be provided that the furnace comprises three shafts and three gas transfer channels which each interconnect two of said aforementioned shafts, as well as an injection device for injecting gas containing additional oxygen into each one of said gas transfer channels.

Other embodiments of the furnace according to the invention are indicated in the annexed claims.

Other details and particularities of the invention shall appear in the description given hereinafter, in a non-limiting way, in reference to the annexed drawings.

Figure 1A:
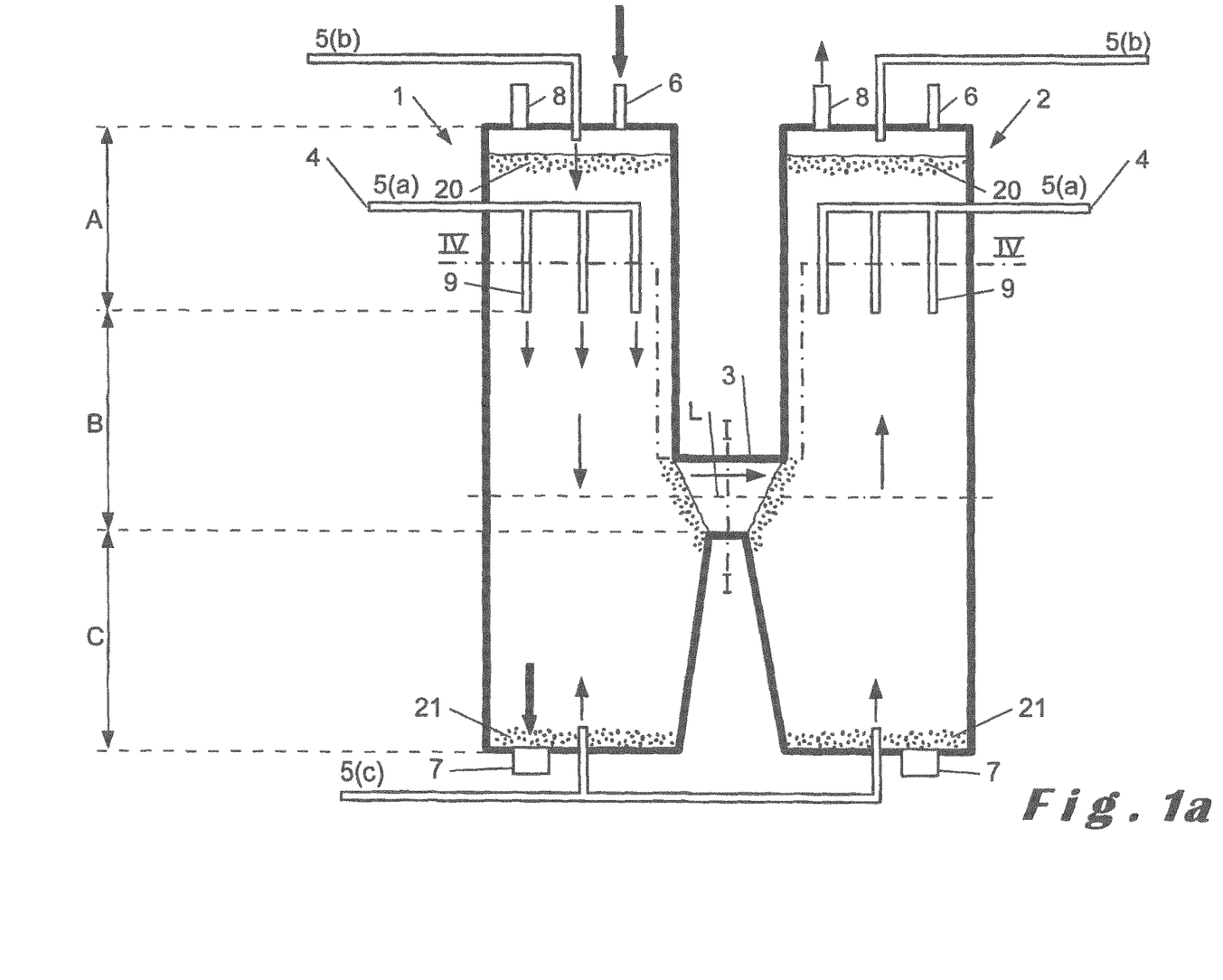
FIG. 1a diagrammatically shows a regenerative parallel-flow vertical shaft furnace with a rectangular section and with two shafts connected by a crossover channel.

In FIG. 1a, a regenerative parallel-flow vertical shaft furnace for the production of calcined mineral rock is shown diagrammatically. In this diagram, the furnace comprises two shafts 1 and 2 with rectangular section, interconnected by a crossover channel 3 which, in this example, directly connects the two shafts. The mineral rock 20 is loaded by the upper portion of the shafts, for example by the inlet 6, where it is in the preheating zone A. Each shaft has a device for supplying with fuel 4 that comprises fuel lances 9 and devices for supplying gas containing oxygen 5(a) and 5(b) for the combustion of the fuel. The mineral rock initially loaded in the preheating zone A, which extends from the upper portion of the shaft to the end of the fuel lances 9, then passes into the firing zone B between the end of the fuel lances 9 and the lower level of the crossover channel 3. The calcined mineral rock 21 is recovered in the lower portion of the shafts in the cooling zone C and unloaded, for example via the outlet 7, and the gases from the combustion are removed via the upper portion of shafts 1 and 2, for example via the exhaust stack 8.

The shafts 1 and 2 of a regenerative parallel-flow vertical shaft furnace operate in alternation in a cycle with two steps: in a first step, the first shaft is used for firing when the second shaft is used for preheating and, inversely, in a second step, the second shaft is used for firing when the first shaft is used for preheating. The loading of the mineral rock is generally done in the middle of the cycle, at the same time as the switching of the fluid circuits from one shaft to the other allowing for the inverting of the flows of gas in the furnace. In FIG. 1a, the shaft 1 is in firing mode, while the shaft 2 is in preheating mode. In the shaft in firing mode 1, the fuel is supplied by the lances 9 of the supply device 4 and the air required for the combustion of this fuel is supplied by the fuel lances 5(a) (primary air) and by the upper portion 5(b) (secondary air) of the shaft 1 through the rock located in the preheating zone A that was preheated beforehand. This makes it possible to reach, in the firing zone B, a temperature that is high enough to carry out the firing of the rock. The calcined rock produced as such and cooled in the cooling zone C by the air supplied by the device 5(c) at the lower portion of the first shaft 1 is recovered by the outlet 7 provided at this lower portion of the shaft. The exhaust stack 8 of the shaft in firing mode is closed. The primary air supplied by the device 5(a) as well as the secondary air introduced by the device 5(b) in the upper portion of the shaft 1 and the cooling air supplied by the device 5(c) as such force a circulation of the gases to the shaft in preheating mode 2 where only a portion of the cooling air is injected in 5(c). The gases from the combustion of fuel in the first shaft 1 in firing mode therefore pass through the crossover channel 3 before reaching the second shaft 2 of the furnace in preheating mode where no fuel or gas containing primary or secondary oxygen is supplied. The mineral rock loaded into the preheating zone A of this second shaft 2 recovers, then, the calorific energy of these combustion gases via heat exchange, before they exit the furnace via the exhaust stack 8 which, in the shaft in preheating mode, is open. The rock is as such preheated for the moment when this second shaft will operate in firing mode.

Figure 2:
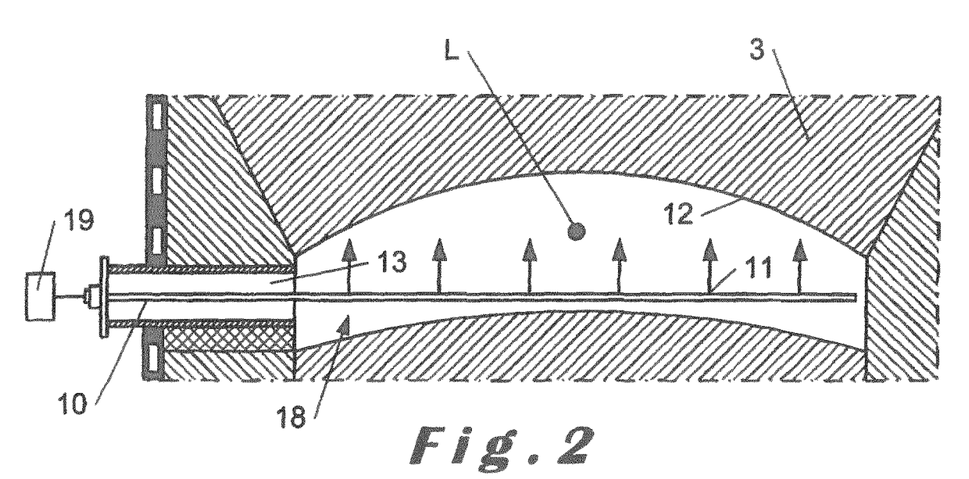
FIG. 2 shows a cross-section view, along the line I-I of FIG. 1a, of a crossover channel of an embodiment of a furnace according to the invention.
Figure 3:
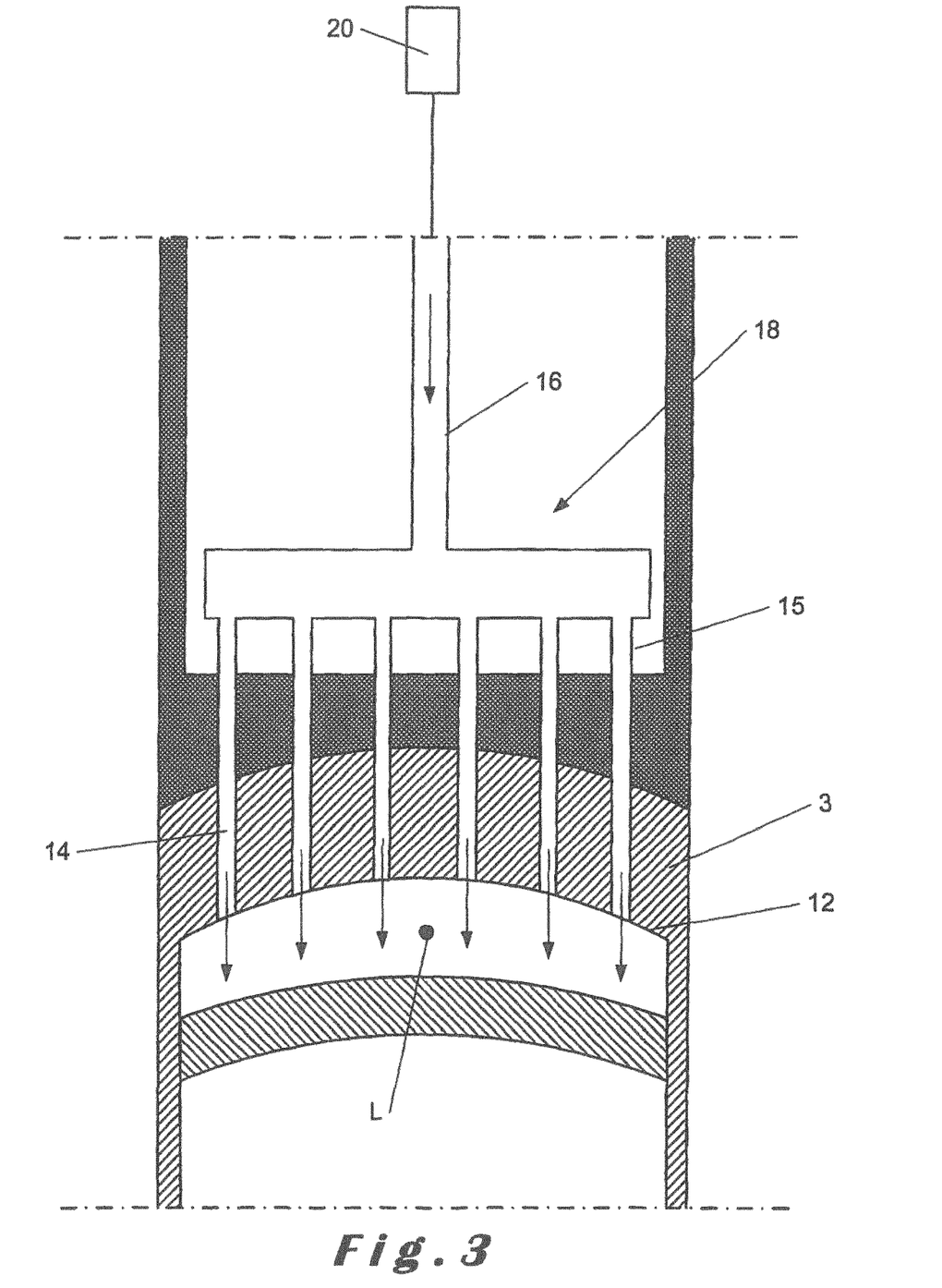
FIG. 3 shows a cross-section view, also along the line I-I of FIG. 1a, of another embodiment of the crossover channel of a furnace according to the invention.

Such a furnace can, according to this invention, comprise, as shown in FIGS. 2 and 3, an injection device 18 for injecting gas containing additional oxygen in the crossover channel 3. This device 18 has for advantage to oxidise, in the crossover channel 3, the unburnt products, mainly carbon monoxide, contained in the combustion gases coming from the shaft in firing mode 1 and this before they exit the shaft 2. The crossover channel 3 is the ideal place to receive this air injection device 18 because its central position with respect to the shafts 1 and 2 makes it possible to use this air injection device independently due to the fact that it is in the first or the second step of the cycles of the furnace, and therefore independently from the fact that the shaft 1 is in firing mode and the shaft 2 in preheating mode or the opposite. The oxidation of the unburnt products in the crossover channel has for effect to maintain, otherwise even increase, the temperature of the combustion gases before they are used for the preheating of the rocks in the shaft 2. Unburnt products are obtained after the combustion, and they are obtained in particular when the supply of gases containing oxygen for the combustion 5(a) and/or 5(b) is decreased in the shaft in firing mode in such a way as to cause as such incomplete combustion of the fuel. Such a reduction in the supply of air in the shaft in firing mode 1 can be carried out by decreasing the quantity of primary air 5(a) that is injected by the fuel lances 9 and which is used in particular for the combustion of the latter. In the case of a solid fuel, all or a portion of this primary air is premixed with the fuel and is used in particular for the transport of the latter; because of this, the primary transport air is a main contributor to the formation of $NO_x$ with respect to oxygen intimately mixed with the fuel and therefore immediately available. Another way to carry out an incomplete combustion in the shaft in firing mode 1 consists in reducing the supply of secondary air 5(b) which is injected by the upper portion of the shaft in firing mode 1 through rocks in the preheating zone A. It is also of course possible to simultaneously reduce the quantities of primary air and of secondary air.

Alternatively, if the reducing of the quantity of primary air is not possible, due to the fact in particular that the latter is required for the transport of the solid fuel, it is also possible to reduce the concentration in oxygen of this primary air by enriching it with a neutral gas ($N_2$, $CO_2$, etc.) or by substituting it with oxygen-depleted recycled flue gases.

Figure 1B:
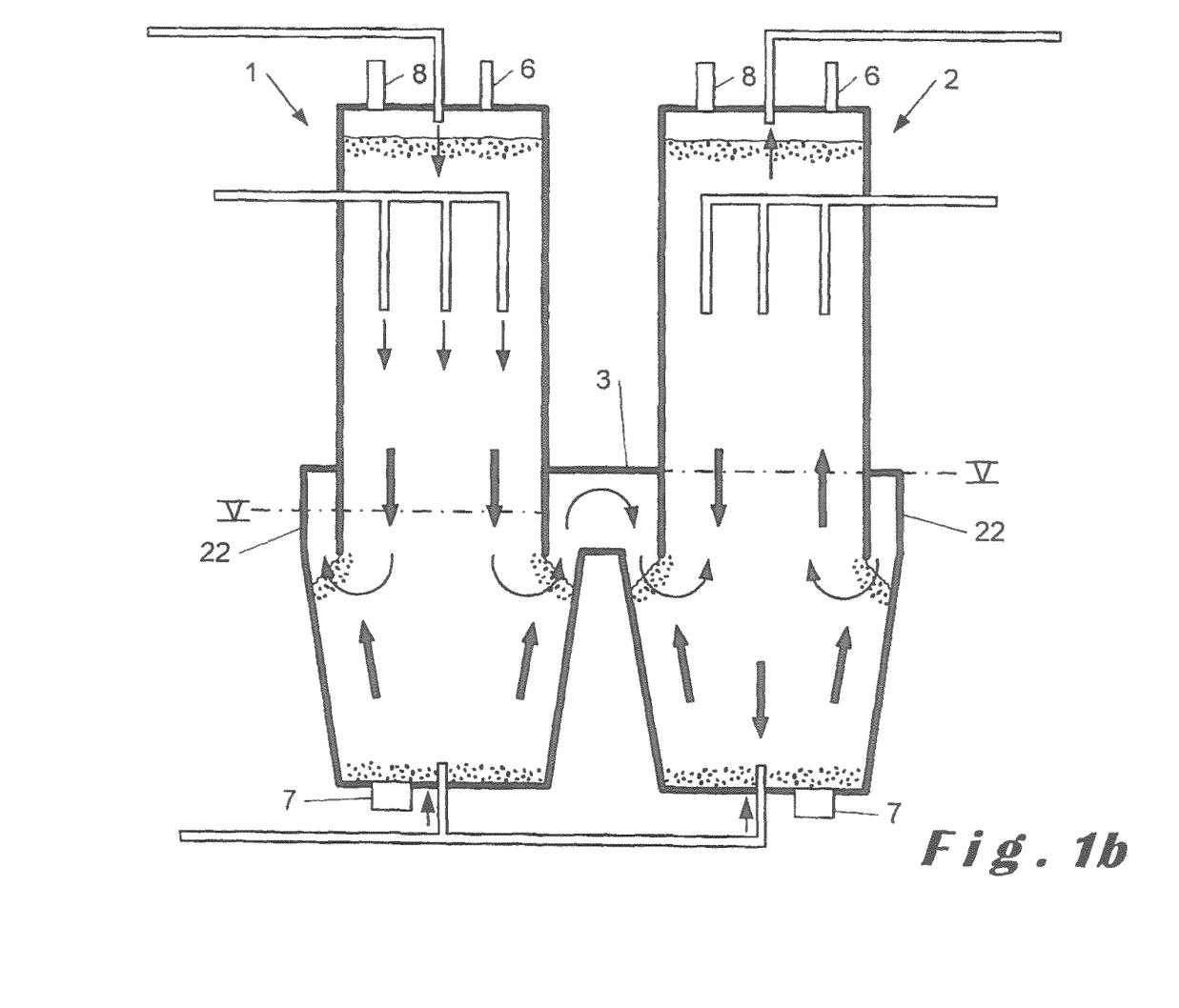
FIG. 1b diagrammatically shows a regenerative parallel-flow vertical shaft furnace with a circular section, with two shafts with annular peripheral channels connected by a crossover channel.
Figure 5:
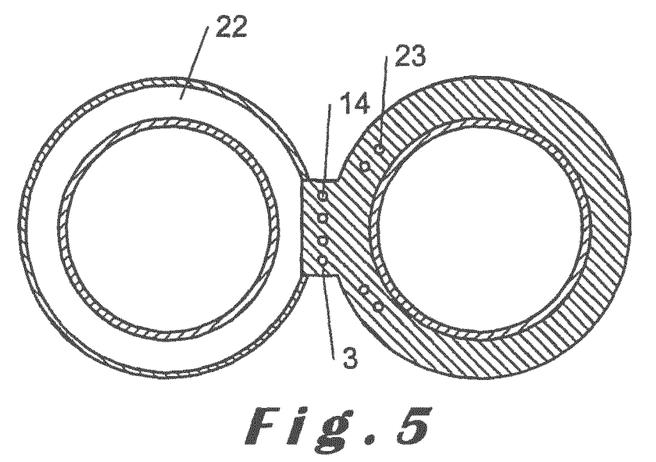
FIG. 5 shows a cross-section view along the line V-V of FIG. 1b of an embodiment of a furnace according to the invention.

Unlike the furnace according to FIG. 1a, the furnace according to FIGS. 1b and 5 has shafts with a circular section. Here the crossover channel 3 connects two annular peripheral channels 22, which each surround a shaft. They are arranged in such a way as to allow an access to the combustion gases from each shaft in the crossover channel and this over the entire periphery of these shafts. These peripheral channels 22 are located outside of the flow of the fired blocks of mineral rock and therefore form with the crossover channel 3 a gas transfer channel that interconnects the two shafts.

FIG. 2 shows a cross-section view with respect to the longitudinal axis L of the crossover channel 3 of a first embodiment of the furnace according to the invention. According to this embodiment, the furnace has a straight unit 10 inserted into the crossover channel 3 by an opening 13 and placed transversely with respect to the longitudinal axis L of this crossover channel 3, or horizontally as shown in FIG. 2, or with a certain angle of inclination in relation to the horizontal, in such a way that the orifices 11 at the end of the unit are closer to the ceiling 12 of the crossover channel than the orifices 11 close to the opening 13. The orifices 11 of the unit 10 are oriented in such a way as to inject the gas containing additional oxygen preferably towards the ceiling 12 of the crossover channel 3. It is effectively on this ceiling that the quantity of unburnt products is the most substantial and that the temperature is ideal for the oxidation of the latter. The unit 10 is advantageously inserted at an equal distance from the two shafts 1 and 2 in order to be able to use the device independently of the firing and preheating modes of the shafts. It is supplied with gas by a source of gas that contains additional oxygen 19, shown diagrammatically.

FIG. 3 shows a cross-section view with respect to the longitudinal axis L of the crossover channel 3 of another embodiment of the furnace according to the invention. According to this embodiment, the crossover channel 3 has openings 14 in its ceiling 12. The openings 14 in the ceiling 12 of the crossover channel are advantageously located in a plane that is equally distant from the shafts (see FIG. 4) and perpendicular to the longitudinal axis L of the crossover channel 3. The gas containing additional oxygen can be supplied by a series of ducts 15 leading to the openings 14 of the ceiling 12 of the crossover channel 3. These ducts can be grouped together into one main duct 16 coming from the source 20 of the injected gas, which is shown diagrammatically. A compressor, not shown, placed upstream from this duct 16 makes it possible to adjust the flow rate of the air injected in order to overcome, furthermore, the positive pressure that is in the furnace. Moreover, the openings 14 provided directly in the ceiling 12 of the crossover channel 3 make it possible to inject the additional air directly into the zones containing most of the unburnt products and having an optimum temperature for the oxidation thereof.

Figure 4:
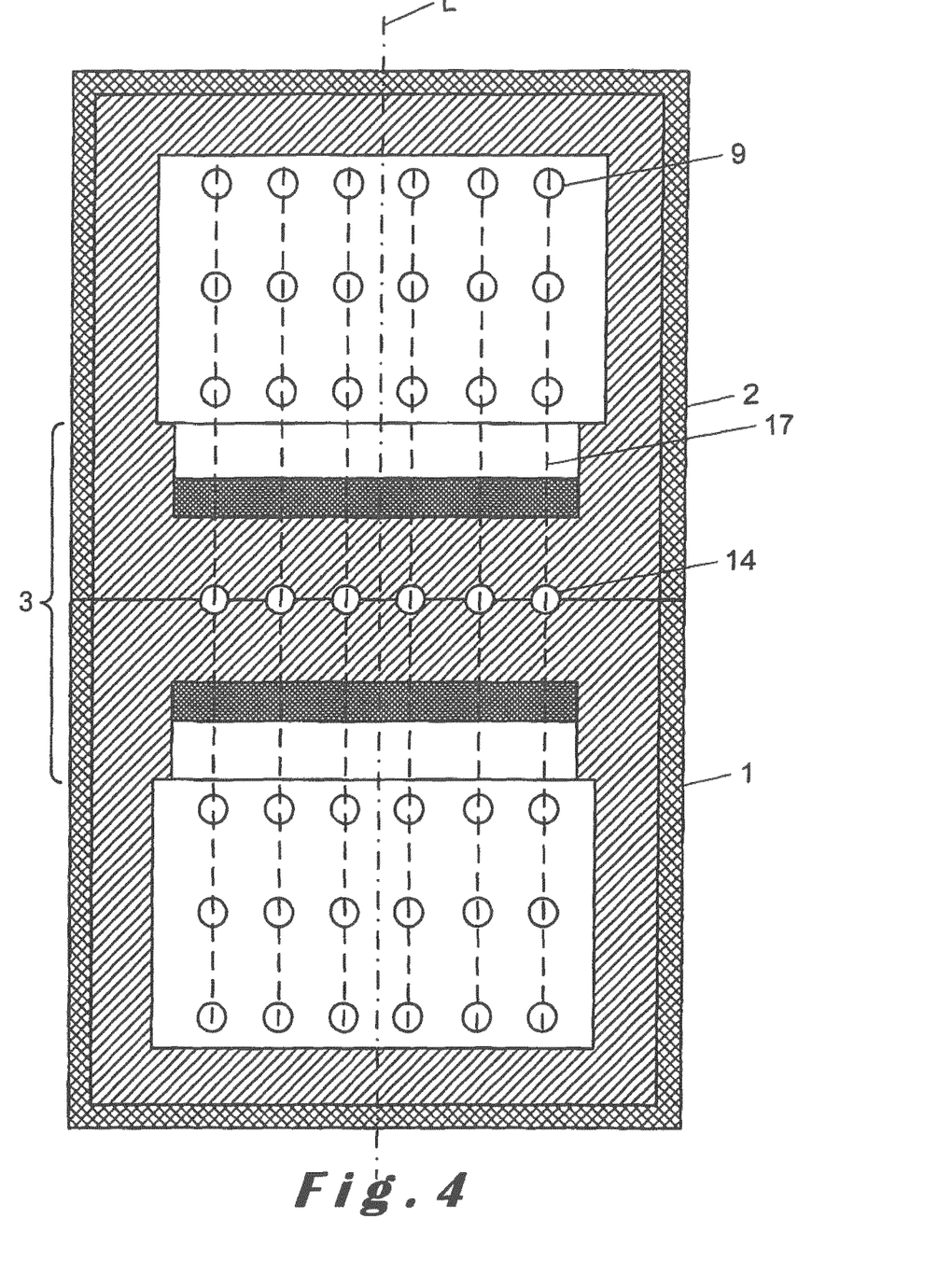
FIG. 4 shows a view along the line IV-IV of FIG. 1a of an embodiment of the furnace, such as shown in FIG. 3.

In FIG. 4, the shafts 1 and 2 of the furnace are on either side of the crossover channel 3 wherein openings 14 are located in a plane that is equally distance from shafts 1 and 2 and perpendicular to the longitudinal axis L of the crossover channel 3. In this case of rectangular shafts, the device for supplying with fuel 4 comprises six series of three fuel lances 9 arranged in such a way as to create beams of streams of fuel located in six planes 17 parallel to one another and parallel to the longitudinal axis L of the crossover channel 3. FIG. 4 reveals that the openings 14 in the ceiling 12 of the crossover channel 3 are positioned in these parallel planes 17. These planes correspond to the combustion gas flow lines that come from the shaft in firing mode 1 and wherein there is the highest concentration in unburnt products of this gas flow.

As shown in FIG. 5, which shows a cross-section view of a furnace of the type shown in FIG. 1b, the injection of the gases containing additional air can be carried out not only through the openings 14 provided in the crossover channel, but also by the openings 23 provided in the peripheral channels 22.

Figure 6:
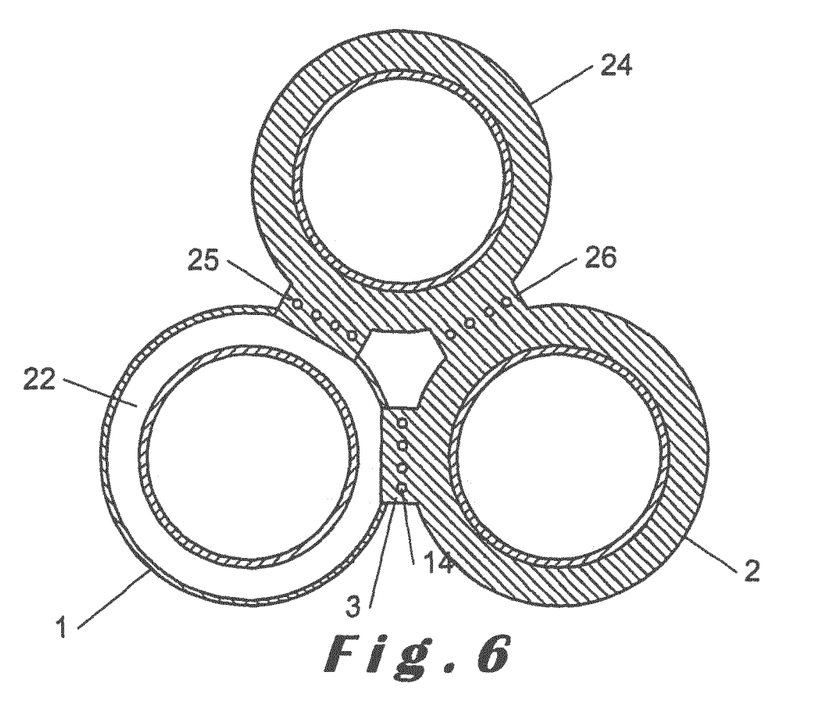
FIG. 6 shows a cross-section view similar to that of FIG. 5 in a furnace according to the invention comprising three shafts.

FIG. 6 shows a cross-section view in such an embodiment of the furnace according to the invention comprising 3 shafts 1, 2 and 24 interconnected by 3 crossover channels 3, 25 and 26. The shafts 2 and 24 are in preheating mode while the shaft 1 is in firing mode and so on.

Comparative Example 1

A regenerative parallel-flow industrial furnace that has two rectangular shafts interconnected by a crossover channel allowing for the direct passage of the gases from one shaft to the other was used in standard conditions to produce quicklime. A fuel containing about 2% by weight of organic nitrogen, in relation to the total weight of the fuel, such as a mixture of wood sawdust and of wood waste (50/50) was used in this installation. In these standard conditions, in the shaft in firing mode, the flow rate of primary air (serving here for the transport of fuel) is 2,700 $Nm^3/h$, the flow rate of secondary air is 5,526 $Nm^3/h$ and the flow rate of fuel is 1,790 kg/h. The limestone rock once fired is cooled thanks to a flow rate of cooling air of 4,990 Nm3 h. This installation allows for the firing of 311 tonnes of rock per day, which corresponds to 175 tonnes of fired product (quicklime) per day.

Comparative Example 2

In the regenerative parallel-flow furnace shown in comparative example 1, an incomplete combustion was produced in the shaft in firing mode thanks to a reduction in the supply of air into the latter, with respect to its standard operation. This reduction was obtained by reducing by about 12% by volume the secondary air flow injected, which means that the secondary air flow changed from 5,526 $Nm^3/h$ to 4,842 $Nm^3/h$. A reduction in the concentration of the $NO_x$ in the flue gases of about 12% by volume was as such reached. It was however ensured that a temperature sufficient for carrying out the calcining of the rocks was maintained, i.e. a temperature greater than 900° C.

However, this reduction in the supply of air in the shaft in firing mode also resulted in a notable increase in the formation of unburnt products, such as carbon monoxide CO, able to deteriorate the energy output of the furnace and give rise to environmental problems following the emission thereof.

Example According to the Invention

A device for injecting additional air according to the invention was installed in the furnace shown in comparative example 2 in order to oxidise the unburnt products obtained following the incomplete combustion. The device for injecting additional air is such as shown in FIGS. 3 and 4 where six openings for the injection of additional air are present in the ceiling of the crossover channel, openings which are arranged in the planes of six series of four fuel lances, planes through which pass the gas flow lines where the concentration of unburnt products is the highest.

The device for injecting additional air was dimensioned based on very critical conditions in terms of the content of CO. Indeed, it was considered that the maximum content of CO able to be reached at the outlet of the stack is 1% by volume with respect to a flue gas containing 11% by volume of oxygen (i.e. 12,500 mg of $CO/Nm^3$ of flue gas), which is known to correspond to about 2% by gross volume of CO on the crossover channel. In practice, however, the content of CO is generally lower. Consequently, the stoichiometric quantity of additional oxygen actually required will be less, suggesting that the flow rate of additional air can be reduced. However, the existing device for injecting additional air imposes a minimum flow rate in order to provide a sufficient speed so as to obtain a good additional oxygen mixture in the flue gases.

In this example, the flow rate of additional air injected corresponds to a quantity of additional oxygen equivalent to 12 times the stoichiometric quantity.

In addition to the oxidation of the unburnt products before the exiting of the combustion gases from the furnace, oxidation that was carried out between 800 and 1,300° C., it was able to be observed that the reduction in $NO_x$ was maintained. A surprising effect of this invention furthermore consisted in the unexpected increase by 3% in the instantaneous productivity of the furnace. Indeed, despite the injection of additional air into the crossover channel, the decrease in the supply of air in the shaft in firing mode leads to a decrease in the load loss and therefore in the static pressure in this shaft, which then makes it possible to introduce a more substantial quantity of limestone rock in the preheating zone of this shaft and therefore to increase the production of the furnace.

The contents of nitrogen oxide $NO_x$ and of carbon monoxide CO were measured at the outlet of the stack (and expressed at 11% oxygen) for the three examples included hereinabove.

1) Standard conditions (Comparative example 1).
2) Reduction in the quantity of air in the shaft in firing mode, but without air intake in the flue (Comparative example 2).
3) Reduction of the quantity of air in the shaft in firing mode and adding of additional air (flow rate=500 $Nm^3/h$) in the flue Example According to the Invention

TABLE 1

|  | 1 | 2 | 3 |
| --- | --- | --- | --- |
| Content in NOx (mg/Nm³) | 400 | 350 | 350 |
| Content in CO (mg/Nm³) | 100-200 | 500-800 | 100-200 |

This comparative table makes it possible to reveal the fact that a decrease in the supply of air in the firing shaft reduces the content of $NO_x$ in the gases emitted at the outlet of the furnace but unfortunately results in a substantial increase in the content of CO (Comparative example 2).

Moreover, when the additional air is injected into the crossover channel, the content of $NO_x$ remains decreased while the contents of CO identical to those obtained in the absence of incomplete combustion are again observed (Example according to the invention).

This invention therefore makes it possible to reduce the emission of $NO_x$ by 12.5% in relation to the standard conditions while still retaining identical contents of CO.

It is of course understood that this invention is not in any way limited to the embodiments described hereinabove and that many modifications can be made thereto without leaving the scope of the annexed claims.

It can for example be noted that the furnace according to the invention can be suitable for firing limestone rock in one shaft and dolomitic rock in another shaft. Note that only one type of rock is contained in a shaft. That is to say that if for example, the shaft in firing mode contains limestone rock, the shaft in preheating mode can contain limestone rock or dolomitic rock and inversely. This results in that during a cycle, quicklime and quick dolime can be produced simultaneously but in different shafts.

The invention claimed is:

1. Method for calcining mineral rock in a regenerative parallel-flow vertical shaft furnace, wherein two shafts are interconnected by a gas transfer channel, wherein said gas transfer channel is a crossover channel that directly connects one shaft to the remaining shaft of the two shafts of said vertical shaft furnace or said gas transfer channel is formed from a crossover channel that connects peripheral channels arranged around each shaft in such a way as to allow an access to combustion gases from each shaft in the crossover channel, and wherein the furnace further comprises a source of air, oxygen enriched air, or oxygen and an injection device connected to the source of air, oxygen enriched air, or oxygen and arranged to inject the air, oxygen enriched air, or oxygen from said source of air, oxygen enriched air, or oxygen into said gas transfer channel wherein:
the injection device comprises at least one straight perforated injection unit introduced into the crossover channel and supplied by said source of air, oxygen enriched air, or oxygen, said injection unit comprises one or several orifices oriented to inject the air, oxygen enriched air, or oxygen from said source of air, oxygen enriched air, or oxygen towards a top portion of the crossover channel; or
the crossover channel has a ceiling and a longitudinal axis (L) and the injection device for injecting air, oxygen enriched air, or oxygen from said source of air, oxygen enriched air, or oxygen comprises one or several openings provided in the ceiling of the crossover channel through which the air, oxygen enriched air, or oxygen can be supplied from said source of air, oxygen enriched air, or oxygen;
the method comprising the steps of:
loading a mineral rock at the top of the shafts, and
unloading a calcined mineral rock at the bottom of the shafts,
operating each shaft alternately in firing mode and in preheating mode, with one shaft being in firing mode for a predetermined period of time while the other shaft is in preheating mode, and inversely,
firing the mineral rock, in the shaft in firing mode, comprising a combustion of fuel in the presence of gas containing oxygen so as to obtain the calcined mineral rock, an emission of combustion gases, and a passage of these combustion gases from the shaft in firing mode to the other shaft in preheating mode by means of said gas transfer channel,
preheating said mineral rock, in the shaft in preheating mode, comprising a heat exchange between said mineral rock and said combustion gases from said gas transfer channel,
wherein the method further comprises a step of injecting, air, oxygen enriched air, or oxygen from said source of air, oxygen enriched air, or oxygen into said gas transfer channel so as to oxidize unburnt products contained in the combustion gases passing through the gas transfer channel.

2. Method according to claim 1, wherein the gas containing oxygen supplied to a shaft in firing mode is in the form of a gas containing primary oxygen, conveyed simultaneously to the fuel, and a gas containing secondary oxygen is introduced at the top of the shaft in firing mode through the rock to be fired.

3. Method according to claim 1, wherein said oxidation of unburnt products is carried out at an oxidation temperature that is high enough to allow for an oxidation of carbon monoxide and low enough to prevent a thermal degradation of molecules of dinitrogen into atomic nitrogen.

4. Method according to claim 3, wherein said oxidation temperature is between 800° C. and 1,300° C.

5. Method according to claim 1, wherein the quantity of air, oxygen enriched air, or oxygen injected into said gas transfer channel using said air, oxygen enriched air, or oxygen is between 0.1 and 50 times the stoichiometric quantity of oxygen calculated based on the quantity of CO measured at the outlet of the furnace in the absence of said air, oxygen enriched air, or oxygen.

6. Method according to claim 1, wherein the air, oxygen enriched air, or oxygen injected into said gas transfer channel contains at least one combustion catalyst.

7. Method according to claim 1, wherein the air, oxygen enriched air, or oxygen injected into said gas transfer channel is injected into the crossover channel at an equal distance from the shafts that it interconnects.

8. Method according to claim 1 wherein the fuel is conveyed into the shaft in firing mode by lances that produce parallel beams of streams of fuel that undergo the combustion and form lines of combustion gases that pass through the crossover channel, with an injection of the aforementioned air, oxygen enriched air, or oxygen into said gas crossover channel being carried out on each one of these lines of combustion gas.

9. Method according to claim 1, wherein said injection of air, oxygen enriched air, or oxygen takes place in the crossover channel, in the peripheral channels or in both the crossover channel and the peripheral channels.

10. Method according to claim 1, wherein the furnace comprises three shafts and three gas transfer channels wherein each gas transfer channel interconnects two of said aforementioned shafts, and wherein one shaft of the three shafts is in firing mode for a predetermined period of time while the remaining shafts are in preheating mode.

11. A regenerative parallel-flow vertical shaft furnace for the production of calcined mineral rock, the furnace comprising:
two shafts interconnected by a gas transfer channel,
with each one of said shafts comprising:
at least one device for supplying fuel,
at least one supply of gas containing oxygen for combustion of the fuel,
an inlet for loading of mineral rock and
an outlet for unloading of calcined mineral rock produced, and
an exhaust stack for removal of combustion gases, wherein the gas transfer channel is a crossover channel that directly connects one shaft to the remaining shaft of the two shafts of said vertical shaft furnace or is formed from a crossover channel that connects peripheral channels arranged around each shaft in such a way as to allow an access to combustion gas from each shaft in the crossover channel, and wherein the furnace further comprises a source of air, oxygen enriched air, or oxygen and an injection device connected to the source of air, oxygen enriched air, or oxygen and arranged to inject the air, oxygen enriched air, or oxygen from said source of air, oxygen enriched air, or oxygen into said gas transfer channel; wherein:

the injection device comprises at least one straight perforated injection unit introduced into the crossover channel and supplied by said source of air, oxygen enriched air, or oxygen, said injection unit comprises one or several orifices oriented to inject the air, oxygen enriched air, or oxygen towards a top portion of the crossover channel; or the crossover channel has a ceiling and a longitudinal axis (L) and the injection device for injecting air, oxygen enriched air, or oxygen comprises one or several openings provided in the ceiling of the crossover channel through which the air, oxygen enriched air, or oxygen can be supplied from said source of air, oxygen enriched air, or oxygen.

12. Furnace according to claim 11, wherein the crossover channel has a longitudinal axis (L) and said at least one straight perforated injection unit is placed transversely with respect to the longitudinal axis of the crossover channel.

13. Furnace according to claim 11, wherein said injection unit is introduced into the crossover channel by an opening that is equally distant from said shafts.

14. Furnace according to claim 11, wherein the device for supplying with fuel comprises one or several series of one or several single-strewn or multi-stream lances arranged in such a way as to produce parallel beams of streams of fuel in the corresponding shaft, with these beams being parallel to one another, with the streams of fuel of the various aforementioned beams being located in several planes parallel to the longitudinal axis (L) of the crossover channel.

15. Furnace according to claim 14, wherein orifices of the injection unit or openings in the ceiling of the crossover channel for the injection of the air, oxygen enriched air, or oxygen are provided in said planes formed by the aforementioned beams.

16. Furnace according to claim 11, characterised in that the aforementioned injection device is arranged to inject air, oxygen enriched air, or oxygen into the crossover channel, in the peripheral channels or both in the crossover channel and the peripheral channels.

17. Furnace according to claim 11, comprising three shafts and three gas transfer channels which each interconnect two of said aforementioned shafts, as well as an injection device for injecting air, oxygen enriched air, or oxygen into each one of said gas transfer channels.

* * * * *